(12) United States Patent
Rossen et al.

(10) Patent No.: US 12,197,559 B2
(45) Date of Patent: Jan. 14, 2025

(54) CONFIGURATION COMPLIANCE CHECK PRIOR TO DEPLOYMENT

(71) Applicant: MICRO FOCUS LLC, Santa Clara, CA (US)

(72) Inventors: Lars Rossen, Ballerup (DK); Soumajit Das, Bangalore (IN); Munirathnam Kumar, Bangalore (IN)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/799,854

(22) PCT Filed: Jan. 31, 2022

(86) PCT No.: PCT/US2022/014515
§ 371 (c)(1),
(2) Date: Aug. 15, 2022

(87) PCT Pub. No.: WO2023/080914
PCT Pub. Date: May 11, 2023

(65) Prior Publication Data
US 2024/0184874 A1 Jun. 6, 2024

Related U.S. Application Data
(60) Provisional application No. 63/276,723, filed on Nov. 8, 2021.

(51) Int. Cl.
*G06F 21/44* (2013.01)
*G06F 9/445* (2018.01)

(52) U.S. Cl.
CPC ............ *G06F 21/44* (2013.01); *G06F 9/4451* (2013.01)

(58) Field of Classification Search
CPC .............................. G06F 21/44; G06F 9/4451
See application file for complete search history.

(56) References Cited

U.S. PATENT DOCUMENTS

| | | | | |
|---|---|---|---|---|
| 7,653,893 B2* | 1/2010 | Neumann | ................. | G06F 8/71 |
| | | | | 717/124 |
| 9,531,757 B2* | 12/2016 | Henry | ................... | G06F 21/604 |
| 10,678,586 B1* | 6/2020 | Hecht | ........................ | G06F 8/71 |
| 10,785,128 B1* | 9/2020 | Bawcom | ................ | G06F 9/451 |
| 10,785,166 B1* | 9/2020 | Rothschild | ........... | H04L 67/563 |
| 10,990,370 B1* | 4/2021 | Bawcom | ............. | H04L 41/0895 |
| 11,038,762 B2* | 6/2021 | Harvesf | .............. | H04L 41/0895 |
| 11,150,950 B2* | 10/2021 | Kumar | .................. | G06F 9/5061 |
| 2014/0331277 A1* | 11/2014 | Frascadore | ......... | G06F 9/45558 |
| | | | | 726/1 |

(Continued)

OTHER PUBLICATIONS

International Search Report & Written Opinion; PCT/US2022/014515; Mailed Jul. 27, 2022; 10 pages.

*Primary Examiner* — Richard G Keehn
(74) *Attorney, Agent, or Firm* — Sheridan Ross P.C.

(57) ABSTRACT

A request is received to deploy a configuration on a computing resource. A compliance check on the configuration is performed according to a policy to determine whether deployment of the configuration on the computing resource is permitted. In response to determining that the deployment of the configuration on the computing resource is permitted, a deployer for the computing resource is controlled to deploy the configuration on the computing resource.

20 Claims, 6 Drawing Sheets

(56) References Cited

U.S. PATENT DOCUMENTS

| | | | |
|---|---|---|---|
| 2015/0312274 A1* | 10/2015 | Bishop | H04L 63/20 |
| | | | 726/1 |
| 2015/0358392 A1* | 12/2015 | Ramalingam | H04L 67/131 |
| | | | 709/203 |
| 2017/0345016 A1* | 11/2017 | Meek | G06F 16/951 |
| 2021/0084048 A1* | 3/2021 | Kannan | H04L 63/104 |
| 2022/0357954 A1* | 11/2022 | Adam | G06F 11/3604 |
| 2023/0229458 A1* | 7/2023 | Andrews | G06F 9/4451 |
| | | | 726/6 |

* cited by examiner

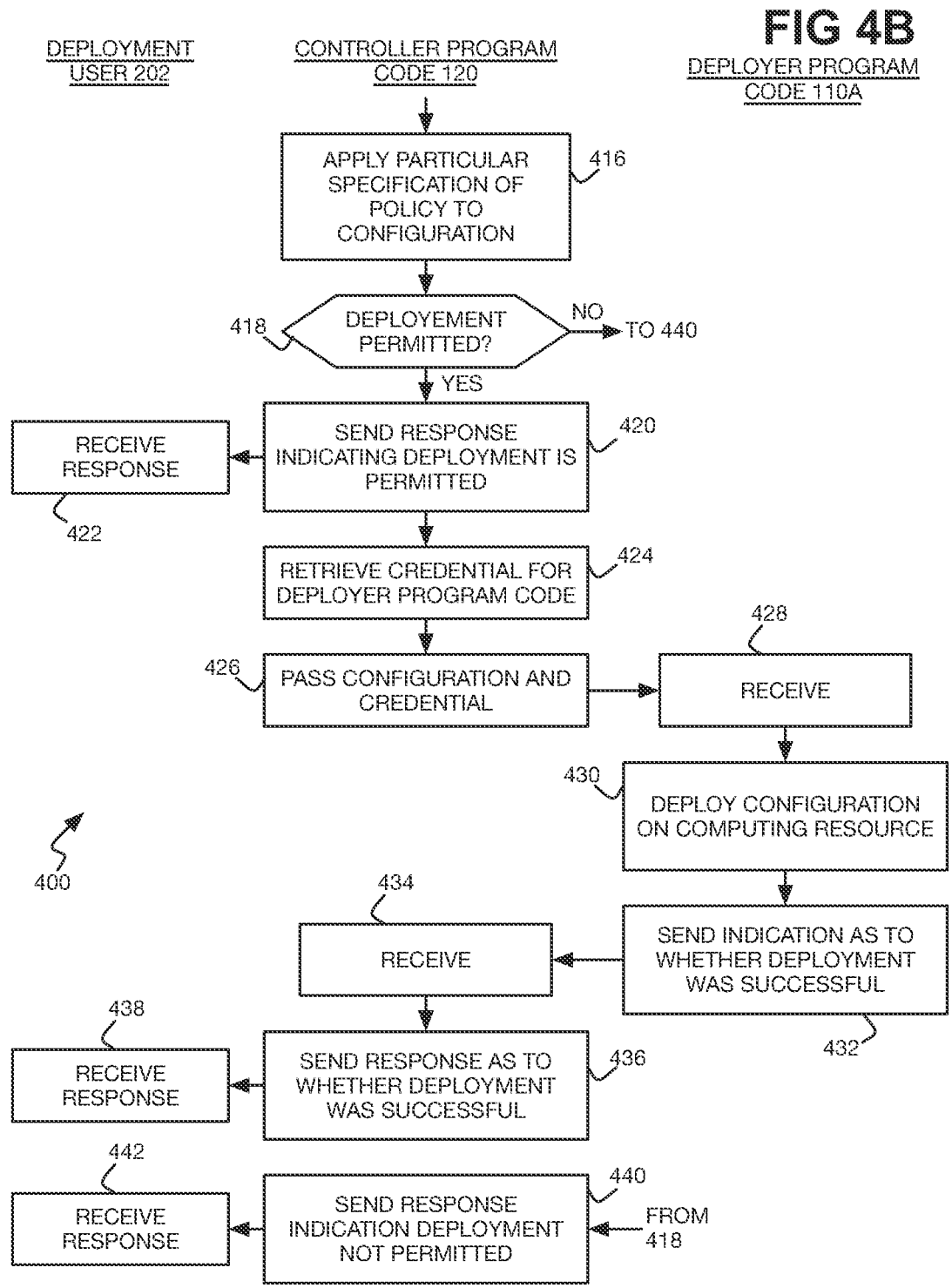

CONFIGURATION COMPLIANCE CHECK PRIOR TO DEPLOYMENT

BACKGROUND

Computing resources include applications and other software, including software containers; hardware and software network resources; other physical hardware such as server and other computing devices; virtual hardware such as virtual machines; and cloud computing resources. Computing resources can also include computing infrastructure, which spans the hardware and software needed to provide services. A configuration can be deployed on a computing resource. A configuration can include a description as to how to create, alter, or update the computing resource, or a description as to an end state resulting from creating, altering, or updating the computing resource.

BRIEF DESCRIPTION OF THE DRAWINGS

FIGS. 4A and 4B are flowcharts of an example method for performing a compliance check on a configuration before deploying the configuration on a computing resource.

DETAILED DESCRIPTION

Figure 1:
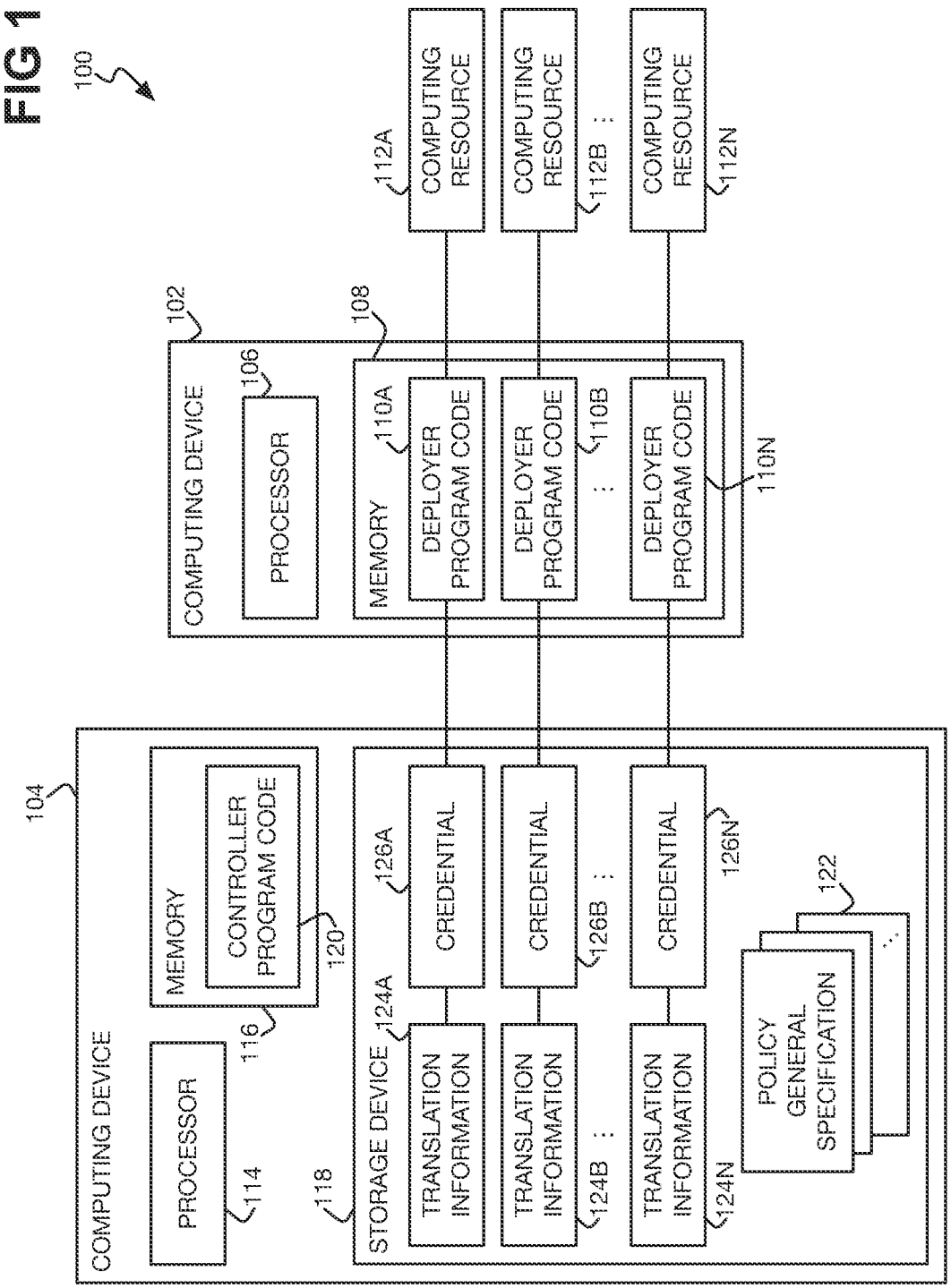
FIG. 1 is a diagram of an example system in which a compliance check can be performed on a configuration before deployment of the configuration on a computing resource.

As noted in the background section, a configuration can be deployed on a computing resource. A configuration may be deployed on a computing resource using deployer program code for the computing resource, which can also be referred to as a deployer. Examples of deployers include Terraform®, which is an opensource infrastructure tool that provides a consistent command line interface (CLI) by which diverse cloud services can be commonly deployed via configurations; and Chef®, which also is an infrastructure tool by which infrastructure and applications can be deployed via configurations, and which is available from Progress Software Corp., of Bedford, Mass.

Other examples of deployers include Puppet®, which is an opensource deployment tool by which multiple application servers can be deployed via configurations; and Ansible®, which is an automation tool by which enterprise infrastructure can be deployed via configurations, and which is available from Red Hat, Inc., of Raleigh, N.C. Another example of a deployer includes CloudSlang®, which is an opensource tool by which computing resources can be deployed via configurations. Other examples of deployers include scripting engines for deploying computing resources via configurations (i.e., for deploying configurations on computing resources).

In general, a user who is interested in deploying a configuration on a computing resource—and who is referred to as a deployment user herein—interacts directly with the deployer for the computing resource. The deployment user via a computing device provides a configuration to the deployer, and may also provide credentials to the deployer that permit the deployment user to deploy the configuration on the computing resource using the deployer. The deployer in turn authenticates the credentials, and if successful, attempts to deploy the configuration on the computing resource. The deployer then returns a response back to the computing device of the deployment user as to whether deployment was successful.

The deployment user may be part of an enterprise or other organization that maintains subscriptions for the computing resources by which suitable deployers can deploy configurations on the resources. Another user of the enterprise, who is referred to as a policy user herein, may be responsible for promulgating policies governing what types of configurations can be deployed on which types of computing resources. The deployment user may thus be expected to ensure that his or her configuration is in compliance with a policy before deploying the configuration on a computing resource using a deployer.

However, there is no way for the policy user to enforce such compliance checking before the deployment user deploys a configuration on a computing resource using a deployer. The deployer may be provided by a third party separate from the enterprise or other organization of which the deployment and policy users are a part. Therefore, the deployer may not be able to be modified to perform a compliance check on a configuration received from the policy user before deploying the configuration on a computing resource.

The deployer may perform limited checking on a configuration before deployment. However, such checking is just to ensure that it is possible to deploy the configuration on a computing resource, not whether it is permissible to deploy the configuration. That is, even if a configuration is able to be deployed on a computing resource by a deployer, the policies created by the policy user govern whether such configuration deployment is to be permitted.

Furthermore, even if a compliance check tool were developed by the enterprise or other organization to perform a compliance check on a configuration before a deployer is used to deploy the configuration on a computing resource, there is no way to force the deployment user to use the tool prior to deploying the configuration via the deployer. The deployment user may not be aware of such a tool, for instance, or the deployment user may forget to use the tool. Because the deployment user him or herself interacts directly with the deployer, he or she has the credentials necessary to use the deployer, and thus may do so without performing any compliance check on the configuration, either manually or via a compliance check tool.

Techniques described herein ameliorate these and other issues. The techniques described herein provide for controller program code, which is also referred to as a controller, by which a deployment user interacts with a deployer. The controller receives a request from the deployment user (i.e., via a computing device of the deployer user) to deploy a configuration on a computing resource. The controller first performs a compliance check on the configuration according to a policy to determine whether deployment of the configuration on the computing resource is permitted.

Just if the configuration has passed the compliance check does the controller than control a deployer for the computing resource to deploy the configuration on the computing resource. The controller in this respect may have a credential for the deployer that is passed to the deployer along with the configuration, and which authorizes usage of the deployer for the deploying the configuration on the computing resource. The credential may be unavailable to the deployment user, such that the deployment user is unable to deploy the configuration on the computing resource using the deployer except through the controller.

FIG. 1 shows an example system 100 in which a compliance check can be performed on a configuration before deployment. The system 100 includes computing devices 102 and 104, which may be server computers or other types of computing devices. The computing devices 102 and 104 are communicatively connected to one another, such as over the Internet and/or another network.

The computing device 102 may also be referred to as a deployer device or a deployer computing device, whereas the computing device 104 may be referred to as a controller device or a controller computing device. The computing devices 102 and 104 may be maintained by or on behalf of different entities. For example, the computing device 102 may be maintained by or for a third party providing a deployer, whereas the computing device 104 may be maintained by or for an enterprise or other organization that uses the deployer.

The deployer computing device 102 includes a processor 106 and a memory 108. The computing device 102 may also include other components in addition to the processor and the memory 108. The memory 108 stores deployer program code 110A, 110B, . . . , 110N, which are collectively referred to as the deployer program code 110, for computing resources 112A, 112B, . . . , 112N, respectively, which are collectively referred to as the computing resources 112. Each deployer program code 110 can also be referred to as a deployer, and can be executed by the processor 106 to deploy configurations on its corresponding computing resource 112.

In the example of FIG. 1, each deployer program code 110 is responsible for a corresponding computing resource 112. However, in another implementation, a deployer program code 110 may be responsible for more than one computing resource 112. Furthermore, in the example, the same deployer computing device 102 stores and executes more than one deployer program code 110. However, in another implementation there may be multiple deployer devices that each stores and executes one or more than one deployer program code 110.

The controller computing device 104 includes a processor 114, a memory 116, and a storage device 118. The computing device 104 may also include other components in addition to the processor 114, the memory 116, and the storage device 118. The storage device 118 may be a hard disk drive, a solid state drive (SSD), or another type of storage device. The memory 116 stores controller program code 120, which can also be referred to as a controller. The controller program code 120 can be executed by the processor 114 to perform a compliance check on a configuration for a computing resource 112 before controlling the deployer program code 110 for the computing resource 112 to deploy the configuration on the computing resource 112.

In this respect, the storage device 118 stores one or multiple policy general specifications 122. Each policy general specification 122 is a general specification of a policy that may not be particular or specific to any computing resource 112 and/or any deployer program code 110. Each general specification 122 may delineate a policy in a markup language or other format, for instance. The controller program code 120 performs a compliance check on a configuration for a computing resource 112 according to any such policy that is applicable to the computing resource 112 and/or the deployer program code 110 for the computing resource 112.

The storage device 118 further stores translation information 124A, 124B, . . . , 124N, collectively referred to as the translation information 124, for the deployer program code 110A, 110B, . . . , 110N, respectively. Each translation information 124 can be considered configuration information that specifies how to map a policy general specification 122 to a particular policy specification for a corresponding deployer program code 110. The controller program code 120 thus performs a compliance check on a configuration for a computing resource 112 by mapping the general specification 122 for a policy to a particular specification for the policy, and then applying the particular policy specification to the configuration.

It is noted that the deployer program code 110 governs the formatting of a configuration for a corresponding computing resource 112. Because different deployer program code 110 may provide for different formatting of configurations for their corresponding computing resources 112, the general policy specifications 122 may not be able to be directly applied to such diverse configurations. The translation information 124 for a deployer program code 110 thus defines how to map the general policy specifications 122 to particular policy specifications that can be directly applied to configurations for the computing resource 112 to which the deployer program code 110 corresponds.

The storage device 118 also stores credentials 126A, 126B, . . . , 126N, collectively referred to as the credentials 126, for the deployer program code 110A, 110B, . . . , 110N, respectively. The credential 126 for each deployer program code 110 permits usage of the deployer program code 110 to deploy a configuration on the computing resource 112 to which the deployer program code 110 corresponds. After performing a compliance check on a configuration for a computing resource 112, the controller program code 120 thus passes the credential 126 for the deployer program code 110 corresponding to the computing resource 112, along with the configuration, to this deployer program code 110.

The deployer program code 110 in turn authenticates the passed credential 126 to verify that deployment of the configuration on the computing resource 112 is authorized. If authentication is successful, the deployer program code 110 deploys the configuration on the computing resource 112. If authentication is unsuccessful (i.e., if the wrong or no credential 126 is provided), the deployer program code 110 does not deploy the configuration on the computing resource 112. This means that if a deployment user does not have access to the credential 126 apart from usage of the controller computing device 104, the deployment user is forced to use the computing device 104 in order to deploy a configuration on the computing resource 112.

Figure 2:
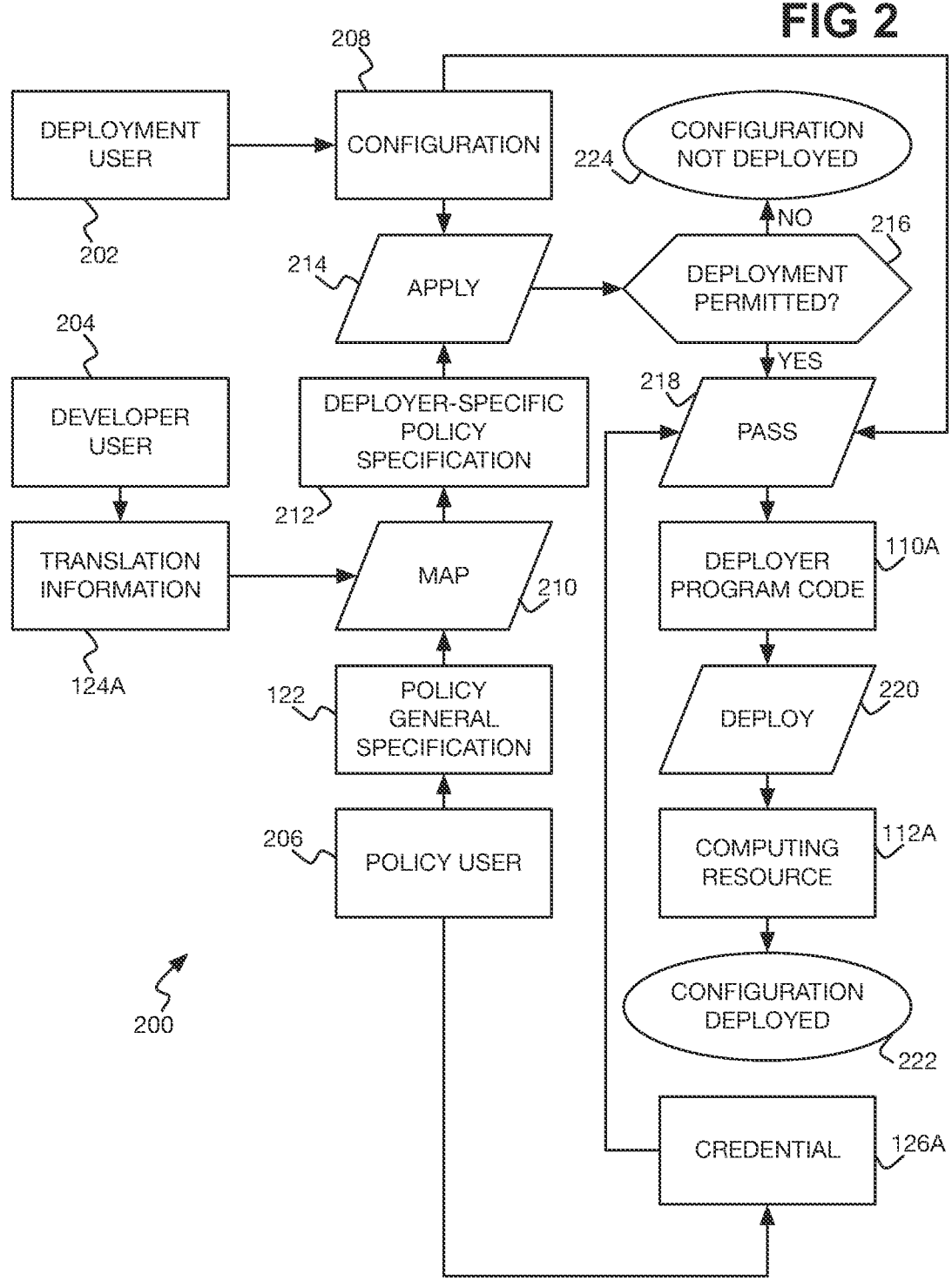
FIG. 2 is a diagram of an example process for performing a compliance check on a configuration before deploying the configuration on a computing resource.

FIG. 2 shows an example process 200 for performing a compliance check on a policy before deploying the configuration on a computing resource 112 in the system 100 of FIG. 1. The process is performed by the controller computing device 104. For instance, the process can be performed by execution of the controller program code 120 by the processor 114 from the memory 116 of the computing device 104. The process is described in relation to the deployment of a configuration on the computing resource 112A in particular for which the deployer program code 110A is used for such deployment. The process involves three users: a deployment user 202, a developer user 204, and a policy user 206. The users 202, 204, and 206 may be part of the same enterprise or other organization, and can be the same user or different users.

The deployment user 202 provides to the controller a configuration 208 that the user 202 wishes to deploy on the computing resource 112A. The deployment user 202 may provide the controller this information by interacting with the controller via a computing device of the deployment user 202 that is communicatively connected to the controller computing device 104. The developer user 204 provides to the controller translation information 124A governing mapping of a policy general specification 122 to a deployer-specific policy specification 212, which is a particular policy specification that can be applied to the configuration 208 for the computing resource 112A as governed by the deployer program code 110A. The developer user 204 may similarly provide the controller this information by interacting with the controller via a computing device of the developer user 204 that is communicatively connected to the controller computing device 104.

The policy user 206 provides to the controller the policy general specification 122, which is a general specification of a policy governing whether deployment of the configuration 208 (and other configurations) on the computing resource 112A (and other computing resources 112) is permitted. The policy user 206 (or another user) may also provide to the controller the credential 126A authorizing usage of the deployer program code 110A to deploy the configuration 208 on the computing resource 112A. The policy user 206 may provide the controller this information by interacting with the controller via a computing device of the policy user 206 that is communicatively connected to the controller computing device 104.

The controller therefore maps (210) the policy general specification 122 to the deployer-specific policy specification 212 using the translation information 124A for the deployer program code 110A. The controller then applies (214) the deployer-specific policy specification 212 to the configuration 208 for the computing resource 112A. In this way, the controller determines whether deployment of the configuration 208 on the computing resource 112A is permitted according to the policy of the general specification 122.

If deployment of the configuration 208 on the computing resource 112A is permitted (216), the controller passes (218) the credential 126A and the configuration 208 to the deployer program code 110A for the computing resource 112A. It is noted that the controller may not modify or adjust the configuration 208 in any way. That is, the configuration 208 received from the deployment user 202 is the same as if the deployment user 202 were interacting directly with the deployer program code 110A. In this respect, the controller (i.e., the controller program code 120) may provide a user interface, such as a graphical user interface (GUI) or a CLI that mimics that of the deployer program code 110A.

Upon being passed the credential 126A and the configuration 208, the deployer program code 110A deploys (220) the configuration 208 on the computing resource 112A, assuming that the credential 126A passes authentication and thus authorizes such deployment. The configuration 208 is therefore deployed on the computing resource 112A (222). By comparison, if deployment of the configuration 208 on the computing resource 112A is not permitted (216), the controller does not pass the credential 126A or the configuration 208 to the deployer program code 110A, and the configuration 208 is not deployed on the computing resource 112A (224).

Figure 3:
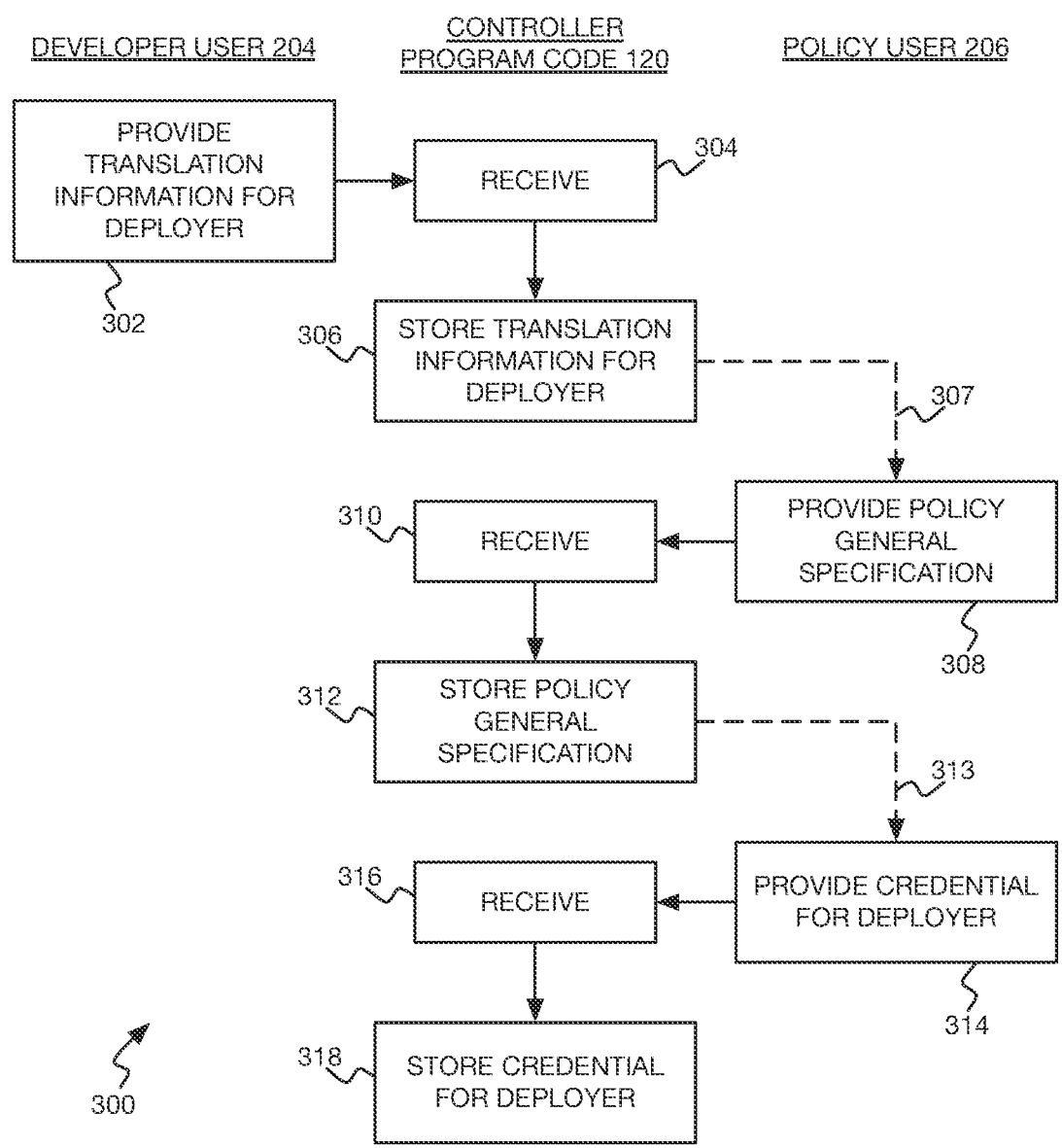
FIG. 3 is a flowchart of an example method for receiving deployer program code-specific translation information, a general specification of a policy, and a credential for deployer program code, on which basis a compliance check can be performed on a configuration before deploying the configuration on a computing resource using the deployer program code.

FIG. 3 shows an example method 300 showing in detail the specifics of the process 200 of FIG. 2 as it pertains to the developer user 204 and the policy user 206. The parts of the method 300 in the left, middle, and right columns are respectively performed by the developer user 204, the controller program code 120 (i.e., the controller) and the policy user 206. That is, a computing device of the developer user 204, the controller computing device 104, and a computing device of the policy user 206 may respectively perform the parts of the method 300 in the left, middle, and rights columns.

The developer user 204 provides translation information 124 for one or more deployers (i.e., for one or more deploy program code 110) to the controller program code 120 (302), which receives (304) and stores the translation information 124 within the storage device 118 (306). At some point thereafter (307) per the example, or concurrently or before in another example, the policy user 206 provides one or more policy general specifications 122 to the controller program code 120 (308). The controller program code 120 receives (310) and stores the one or more policy general specifications 312 within the storage device 118 (312).

Also at some point thereafter (313) per the example, or concurrently or before in another example, the policy user 206 provides a credential 126 for each of one or more deployers (i.e., of one or more deployer program code 110) to the controller program code 120 (314). In another implementation, a user other than the policy user 206 may provide the credentials 126, such as the developer user 204 or another user. The controller program code 120 receives (316) and stores the credential 126 or credentials 126 within the storage device 118 (318).

Figure 4A:
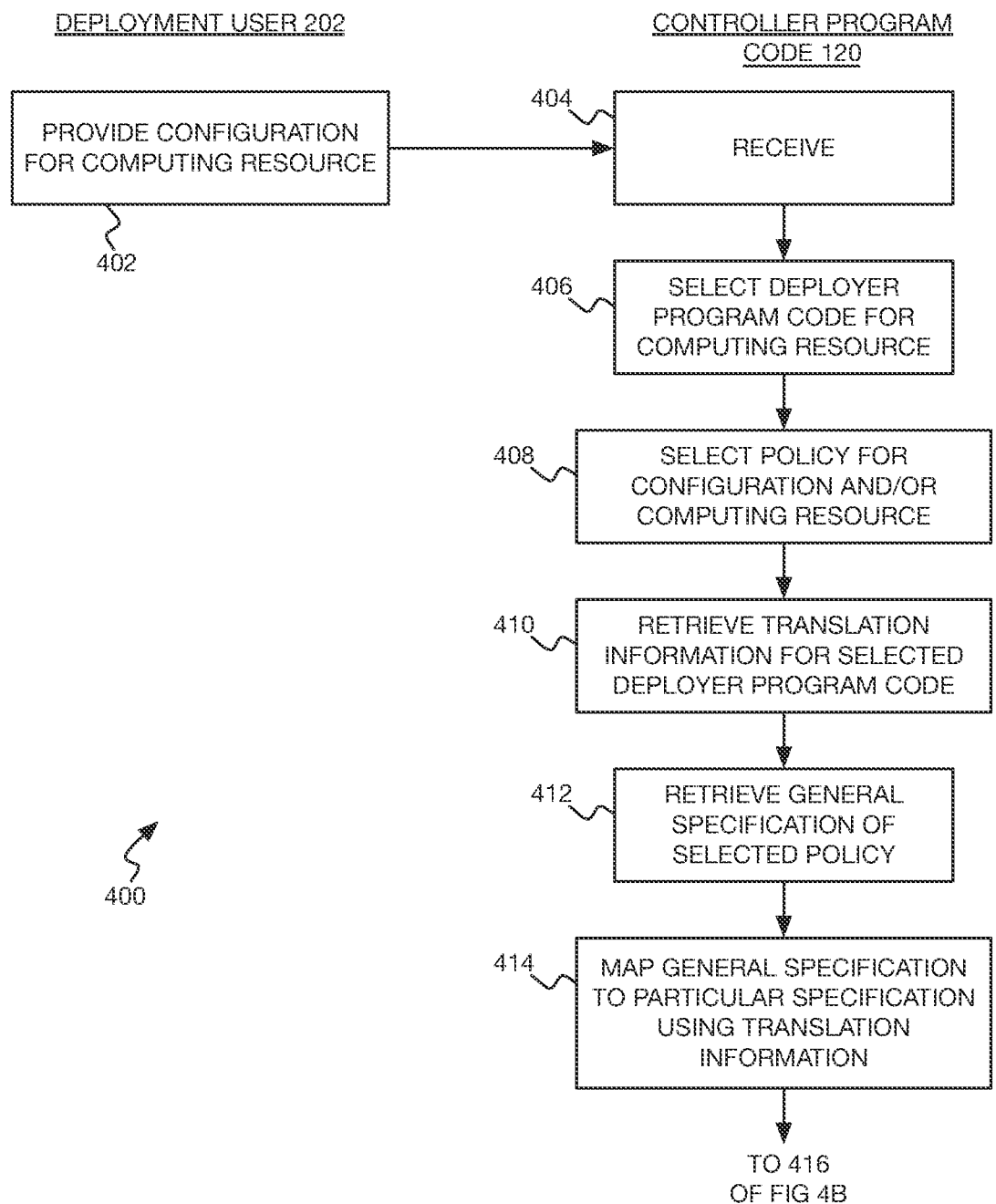

FIGS. 4A and 4B show an example method 400 showing in detail the specifics of the process of FIG. 2 as it pertains to the deployment user 202. Referring first to FIG. 4A, the parts of the method 400 in the left and right columns are respectively performed by the deployment user 202 and the controller program code 120 (i.e., the controller). That is, a computing device of the deployment user 202 and the controller computing device 104 may respectively perform the parts of the method 400 in the left and right columns. The method 400 may be performed after the method 300 of FIG. 3 has been performed. The method 400 is described in relation to the configuration 208 for the computing resource 112A having the corresponding deployer program code 110A.

The deployment user 202 provides the configuration 208 to be deployed on the computing resource 112A to the controller program code 120 (402), which receives the configuration 208 (404). The controller program code 120 in turn selects the deployer program code 110A that corresponds to the computing resource 112A (406), which is the deployer program code 110A that is used to deploy configurations, such as the configuration 208, on the computing resource 112A.

The controller program code 120 also selects a policy for the configuration 208 and/or the computing resource 112A (408). That is, of the policies for which the storage device 118 stores general specifications 122, the controller program code 120 selects the policy that is applicable to the configuration 208 and/or the computing resource 112A. There may be more than one such policy as well in this respect.

Furthermore, as an example, just some policies may be applicable to the configuration 208, and just some policies may be applicable to the computing resource 112A. Therefore, the policy or polices that concern or pertain to both the configuration 208 and the computing resource 112A are selected.

The controller program code 120 retrieves the translation information 124A for the selected deployer program code 110A from the storage device 118 (410). The controller program code 120 similarly retrieves the general specification or specifications 122 for the selected policy or policies (412). Using the retrieved translation information 124A, the controller program code 120 then maps each retrieved general specification 122 to a particular policy specification (414).

Referring next to FIG. 4B, the parts of the method 400 in the left, middle, and right columns are respectively performed by the deployment user 202, the controller program code 120 (i.e., the controller), and the deployer program code 110A (i.e., the deployer). That is, a computing device of the deployment user 202 may perform the parts of the method 400 in the left column. Similarly, the controller computing device 104 may perform the parts of the method 400 in the middle column, and the deployer computing device 102 may perform the parts of the method 400 in the right column.

The controller program code 120 applies each particular policy specification to the configuration 208 to determine whether deployment of the configuration 208 on the computing resource 112A is permitted (416). The configuration 208 may have to pass compliance with the particular specification of every selected policy in order for deployment of the configuration 208 to be permitted on the computing resource 112A. If the configuration 208 fails compliance with the particular specification of any selected policy, deployment of the configuration 208 is not permitted on the computing resource 112A.

If deployment is permitted (418), then the controller program code 120 may send a response to the deployment user 202 indicating that that deployment of the configuration 208 on the computing resource 112A is permitted (420). The deployment user 202 (i.e., a computing device thereof) thus receives this response (422). The controller program code 120 retrieves the credential 126A for the deployer program code 110A from the storage device 118 (424), and passes both the configuration 208 and the credential 126A to the deployer program code 110A (426).

The deployer program code 110A receives the configuration 208 for the computing resource 112A and the credential 126A for the deployer program code 110A (428). The deployer program code 110A then deploys the configuration 208 on the computing resource 112A (430). As part of such deployment, the deployer program code 110A may first authenticate the credential 126A to determine whether usage of the deployer program code 110 for configuration deployment on the computing resource 112A is authorized.

The deployer program code 110A sends an indication back to the controller program code 120 as to whether deployment was successful (432). The controller program code 120 receives this indication (434), and in turns sends a response as to whether deployment was successful back to the deployment user 202 (436), which receives this response (438). Deployment of the configuration 208 on the computing resource 112 may be unsuccessful if the credential 126A does not pass authentication, for instance, if the configuration 208 is one that is not possible to be realized on the computing resource 112A, or if an error occurred during deployment.

If the configuration 208 fails the compliance check and thus its deployment is not permitted on the computing resource 112A (418), then the controller program code 120 instead sends to the deployment user 202 a response indicating that deployment of the configuration 208 is not permitted on the computing resource 112A (440). The deployment user 202 receives this response (442). Therefore, the deployment user 202 may receive a response indicating that deployment is permitted in part 422, followed by a response indicating whether or not deployment was actually successful in part 438, or may receive a response indicating that deployment is not permitted in part 442.

Figure 5:
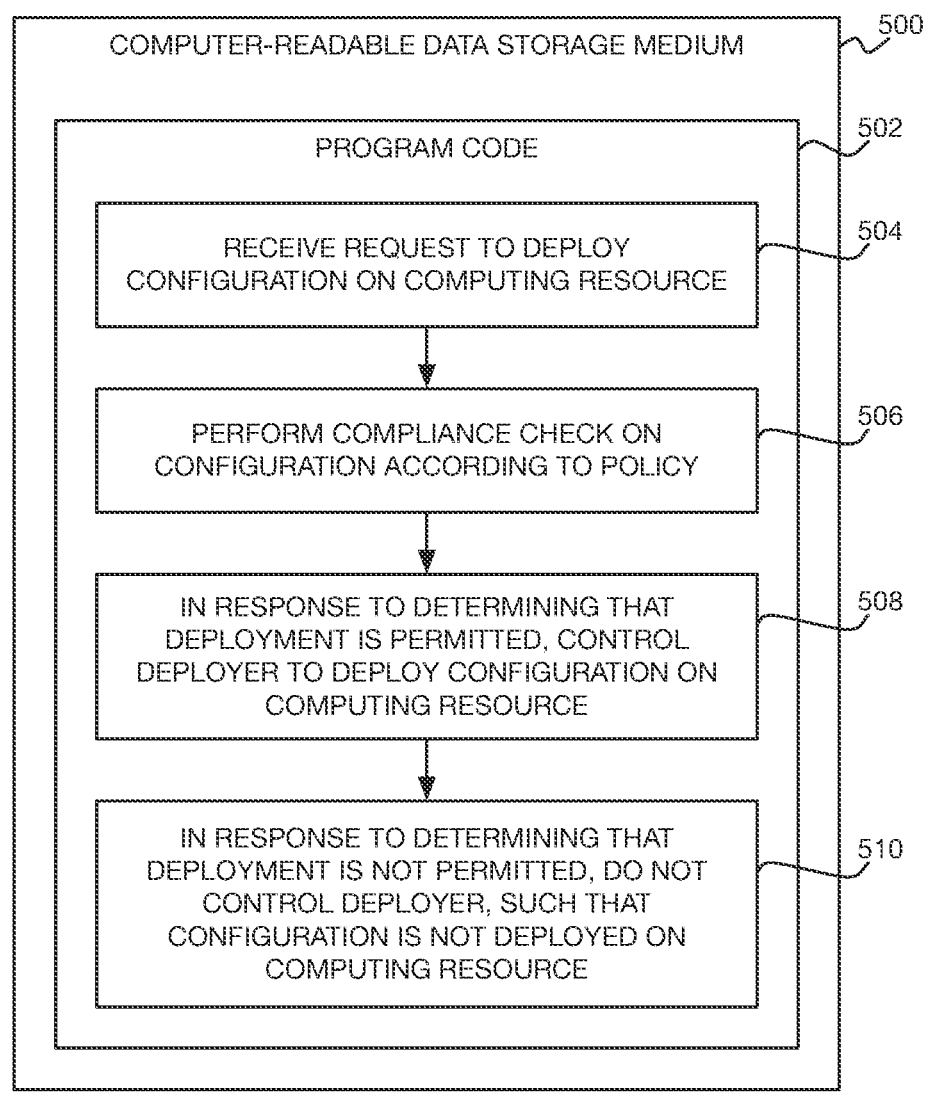
FIG. 5 is a diagram of an example non-transitory computer-readable data storage medium storing program code that is executable to perform a compliance check on a configuration before deploying the configuration on a computing resource.

FIG. 5 shows an example non-transitory computer-readable data storage medium 500 that stores program code 502 executable by a processor. For instance, the program code 502 may be the controller program code 120 that is executable by the processor 114 of the controller computing device 104. As such, the program code 502 is executable by a controller device to perform processing. The processing is described in relation to the configuration 208 for the computing resource 112A having the corresponding deployer program code 110A. The processing includes receiving, from the deployment user 202, a request to deploy the configuration 208 on the computing resource 112A (504).

The processing includes performing a compliance check on the configuration 208 according to a policy to determine whether deployment of the configuration 208 on the computing resource 112A is permitted (506). The processing includes, in response to determining that the deployment of the configuration 208 on the computing resource 112A is permitted, controlling a deployer (i.e., the deployer program code 110A) for the computing resource 112A to deploy the configuration 208 on the computing resource 112A (508). The processing includes, in response to determining that the deployment is not permitted, not controlling the deployer for the computing resource 112A such that the configuration 208 is not deployed on the computing resource 112A (510).

Techniques have been described for performing a compliance check on a configuration 208 prior to deployment of the configuration 208 on a computing resource 112A. A controller both performs the compliance check and, if the compliance check is successful, controls the deployer that actually deploys the configuration 208 on the computing resource 112A. A deployment user 202 may not have access to the credential 126A for the deployer, and therefore be forced to use the controller in order to deploy the configuration 208 on the computing resource 112A, ensuring that the compliance check is performed prior to deployment.

We claim:

1. A non-transitory computer-readable data storage medium storing program code executable by a controller device to perform processing comprising:
   receiving, from a deployment user, a request to deploy a configuration on a computing resource;
   performing a compliance check on the configuration according to a policy, comprising:
   retrieving a general specification of the policy that is not specific to a deployer;
   retrieving translation information for the deployer for the computing resource;
   mapping the general specification of the policy to a particular specification of the policy for the deployer using the translation information; and applying the particular specification of the policy to which the general specification of the policy has been mapped to the configuration to determine whether the deployment of the configuration on the computing resource is permitted; and in response to determining that the deployment of the configuration on the computing resource is permitted, controlling the deployer to deploy the configuration on the computing resource.

2. The non-transitory computer-readable data storage medium of claim 1, wherein the processing further comprises, in response to determining that the deployment of the configuration on the computing resource is not permitted:

not controlling the deployer for the computing resource such that the configuration is not deployed on the computing resource; and sending a response to the deployment user that the deployment of the configuration on the computing resource is not permitted.

3. The non-transitory computer-readable data storage medium of claim 1, wherein the processing further comprises, in response to determining that the deployment of the configuration on the computing resource is permitted:

sending a first response to the deployment user that the deployment of the configuration on the computing resource is permitted;

receiving from the deployer an indication as to whether the deployment of the configuration on the computing resource was successful; and sending a second response to the deployment user as to whether the deployment of the configuration on the computing resource was successful, per the indication received from the deployer.

4. The non-transitory computer-readable data storage medium of claim 1, wherein controlling the deployer for the computing resource to deploy the configuration on the computing resource comprises:

passing to the deployer the configuration and a credential authorizing the deployment of the configuration on the computing resource using the deployer.

5. The non-transitory computer-readable data storage medium of claim 4, wherein the credential is unavailable to the deployment user, such that the deployment user is unable to deploy the configuration on the computing resource using the deployer except through the controller device.

6. The non-transitory computer-readable data storage medium of claim 1, wherein the processing further comprises:

receiving, from a policy user different than the deployment user, the general specification of the policy; and storing the general specification of the policy for subsequent retrieval to map to the particular specification of the policy for the deployer using the translation information.

7. The non-transitory computer-readable data storage medium of claim 1, wherein the processing further comprises:

receiving, from a developer user different than the deployment user, the translation information for the deployer; and storing the translation information for the deployer for subsequent retrieval to use to map the general specification of the policy to the particular specification of the policy for the deployer.

8. The non-transitory computer-readable data storage medium of claim 1, wherein the computing resource comprises one or more of: an application, software, computing infrastructure, a network resource, physical hardware, virtual hardware, and a cloud computing resource.

9. A computing system comprising:

a processor;

a memory storing controller program code executable by the processor to:

perform, on a configuration that has been requested to be deployed on a computing resource, a compliance check according to a policy to determine whether deployment of the configuration on the computing resource is permitted; and in response to determining that the deployment of the configuration on the computing resource is permitted, controlling deployer program code for the computing resource to deploy the configuration on the computing resource; and a storage device storing a credential for each of a plurality of available deployer program code including the deployer program code, the credential for each available deployer program code authorizing configuration deployment on a corresponding computing resource using the available deployer program code.

10. The computing system of claim 9, wherein the controller program code is executable by the processor to control the deployer program code for the computing resource to deploy the configuration on the computing resource by:

selecting, as the deployer program code, the available deployer program code that is used to deploy the configuration on the computing resource;

retrieving the credential for the deployer program code; and passing to the deployer program code the configuration and the credential for the deployer program code.

11. The computing system of claim 9, wherein the credential for the deployer program code is unavailable to a deployment user that requested the deployment of the configuration on the computing resource, such that the deployment user is unable to deploy the configuration on the computing resource using a deployer except through the processor executing the controller program code.

12. The computing system of claim 9, wherein the storage devices further stores:

a general specification of each of a plurality of available policies including the policy, where the general specification of each of the plurality of available policies is not specific to the deployer program code;

translation information for each available deployer program code that governs mapping of the general specification of each available policy to a particular specification of an available policy for the available deployer program code.

13. The computing system of claim 12, wherein the controller program code is executable by the processor to perform the compliance check to determine whether the deployment of the configuration on the computing resource is permitted by:

selecting, as the policy, the available policy that is applicable to the configuration and/or the computing resource;

retrieving the general specification for the policy;

retrieving the translation information for the deployer program code;

mapping the general specification of the policy to the particular specification of the policy for the deployer program code using the translation information for the deployer program code; and applying the particular specification of the policy to which the general specification of the policy has been mapped to the configuration to determine whether the deployment of the configuration on the computing resource is permitted.

14. The computing system of claim 9, wherein the deployer program code is executed by a different computing system.

15. The computing system of claim 9, wherein the computing resource comprises one or more of: an application, software, computing infrastructure, a network resource, physical hardware, virtual hardware, and a cloud computing resource.

16. The computing system of claim 9, wherein the configuration comprises a description as to how to create, alter, or update the computing resource, or a description as to an end state of creating, altering, or updating the computing resource.

17. The computing system of claim 9, wherein the computing resource comprises one or more of: an application, software, computing infrastructure, a network resource, physical hardware, virtual hardware, and a cloud computing resource.

18. A method comprising:
   receiving and storing, by a controller device, a general specification of a policy that is not specific to a deployer used to deploy a configuration on a computing resource;
   receiving and storing, by the controller device, translation information for the deployer governing mapping of the general specification of the policy to a particular specification of the policy for the deployer;
   receiving, by the controller device, a request to deploy the configuration on the computing resource;
   mapping, by the control device, the general specification of the policy to the particular specification of the policy for the deployer using the translation information for the deployer;
   applying the particular specification of the policy to which the general specification of the policy has been mapped to the configuration to determine whether the deployment of the configuration on the computing resource is permitted; and
   in response to determining that the deployment of the configuration on the computing resource is permitted, controlling the deployer to deploy the configuration on the computing resource.

19. The method of claim 18, wherein the method further comprises:
   receiving and storing, by the controller device, a credential authorizing the deployment of the configuration on the computing resource using the deployer,
   wherein controlling the deployer to deploy the configuration on the computing resource comprises:
      retrieving the credential for the deployer; and
      passing to the deployer the configuration and the credential for the deployer, and
   wherein the credential is unavailable to a deployment user, such that the deployment user is unable to deploy the configuration on the computing resource using the deployer except through the controller device.

20. The method of claim 18, wherein the general specification of the policy is received from a policy user, the translation information for the deployer is received from a developer user different than the policy user, and the request to deploy the configuration on the computing resource is retrieved from a deployment user different than the policy user and the developer user.

* * * * *